United States Patent Office 3,146,226
Patented Aug. 25, 1964

3,146,226
METALLIZED DYES FORMED BY COUPLING A BENZENE DIAZO COMPONENT WITH A CYCLIC KETONE
Willy Steinemann, Basel, Switzerland, assignor to Sandoz Ltd., Basel, Switzerland
No Drawing. Filed Aug. 1, 1960, Ser. No. 46,349
Claims priority, application Switzerland Aug. 11, 1959
7 Claims. (Cl. 260—148)

This invention relates to new azo dyes. The process for their production consists in coupling 2 moles of a diazo compound of the benzene series, which may contain in ortho position to the diazo group a hydroxyl or a carboxyl group, with 1 mole of a cyclic ketone which may be further substituted and has the formula

(I)

wherein $n$ stands for 4, 5 and 6.

The azo deystuffs so formed can be built up further by a suitable reaction when they contain substituents capable of dyestuff formation. They can be treated in substance or on the fiber with metal-yielding agents when they contain substituents capable of complex formation with a metal.

The coupling of the diazo compounds with the cyclic ketone of Formula I is carried out preferably in alkaline medium, if necessary in presence of an organic solvent.

Examples of suitable cyclic ketones of Formula I are cyclopentanones, cyclohexanones, preferably cyclohexanone itself, methylcyclohexanones and cycloheptanones.

The following may be mentioned as examples of diazo compounds containing in ortho position to the diazo group a substituent capable of metal complex formation:

2-aminobenzene-1-carboxylic acid,
2-amino-1-hydroxybenzene-4-sulfonic acid-anilide,
2-amino-1-hydroxybenzene-5-sulfonic acid-anilide,
2-amino-1-hydroxybenzene-4- or -5-sulfonic acid-amide,
2-amino-1-hydroxybenzene-4- or -5-sulfonic acid-cyclohexylamide,
2-amino-1-hydroxybenzene-4- or -5-sulfonic acid-tetrahydronaphthyl-(1)-amide,
2-amino-1-hydroxybenzene-4 or -5-sulfonic acid-methylamide,
2-amino-1-hydroxybenzene-4- or -5-sulfonic acid-butylamide,
2-amino-1-hydroxybenzene-4- or -5-sulfonic acid-2'-hydroxyethylamide,
2-amino-1-hydroxybenzene-4- or -5-sulfonic acid-3'-methoxypropylamide,
2-amino-1-hydroxybenzene-4- or -5-sulfonic acid-3'-chlorophenylamide,
2-amino-1-hydroxybenzene-4- or -5-sulfonic acid-3'-sulfamidophenylamide,
2-amino-1-hydroxybenzene-4- or -5-sulfonic acid-3'-dimethylaminosulfonyl-phenylamide,
2-amino-1-hydroxybenzene-4- or -5-sulfonic acid-naphthyl-(1)-amide,
2-amino-1-hydroxybenzene-4- or -5-sulfonic acid-naphthyl-(2)-amide,
2-amino-1-hydroxybenzene-4- or -5-sulfonic acid-3'-acetaminophenylamide,
2-amino-1-hydroxybenzene-4- or -5-sulfonic acid-benzylamide,
2-amino-1-hydroxybenzene-4- or -5-sulfonic acid-dimethylamide,
2-amino-1-hydroxy-4-methylsulfonyl-benzene,
2-amino-1-hydroxy-4-chlorobenzene,
2-amino-1-hydroxy-3,4,6-trichlorobenzene,
2-amino-1-hydroxy-4-acetaminobenzene,
2-amino-1-hydroxy-4-carbethoxyaminobenzene,
2-amino-1-hydroxy-4-methylsulfaminobenzene,
2-amino-1-hydroxy-4-dimethylamino-sulfonylaminobenzene,
2-amino-1-hydroxy-4-nitrobenzene,
2-amino-1-hydroxy-4-tert.butyl-benzene,
2-amino-1-hydroxy-4-pyrrolidonylbenzene,
2-amino-1-hydroxy-6-carbethoxyamino-benzene-4-sulfonic acid,
2-amino-1-hydroxy-4-carbethoxyamino-benzene-5-sulfonic acid,
2-amino-1-hydroxy-benzene-4-sulfonic acid,
2-amino-1-hydroxy-6-chlorobenzene-4-sulfonic acid,
2-amino-1-hydroxy-benzene-4,6-disulfonic acid,
2-amino-1-hydroxy-6-nitrobenzene-4-sulfonic acid,
2-amino-1-hydroxy-4-nitrobenzene-6-sulfonic acid,
1-amino-2-hydroxy-4-chlorobenzene-6-sulfonic acid.

The new dyestuffs can be employed for various purposes. Those which possess no solubilizing groups are employed as disperse dyes and pigments for dyeing artificial fibers and coloring plastics and lacquers. Dyestuffs with water-solubilizing groups, e.g., of the series of the sulfonic acid, sulfonic acidamide, sulfonyl or carboxylic acid groups, are suitable for dyeing textiles of all kinds. Low molecular-weight products are successfully used for dyeing wool, silk, synthetic polyamide fibers and leather and if they contain a substituent capable of complex formation with metal they can be metallized in substance or on the fiber. The dyeings obtained possess very good fastness, especially to migration, light and wet treatments, notably washing, milling and perspiration.

In the folowing examples the parts and percentages are by weight and the temperatures in degrees centigrade.

*Example 1*

27.4 parts of 2-aminobenzene-1-carboxylic acid are dissolved in 200 parts of water with 20 parts of 30% hydrochloric acid, and diazotized in the normal way at 0° with 13.8 parts of sodium nitrite. The pH value of the diazo solution is increased to 12 by addition of 60 parts or 30% hydroxide solution, the temperature being kept below +2° by cooling. With thorough stirring and continued cooling to below +2°, 49 parts of a 20% solution of cyclohexanone in ortho-dichlorobenzene are added dropwise at an even rate in 1 hour.

The mass is stirred further at 0–2° until the coupling reaction is completed. After neutralization of the reaction solution with dilute hydrochloric acid, the new dyestuff is isolated by the addition of common salt, filtered off, washed with common salt solution, dried and ground. It is a dark powder which dyes wool and synthetic polyamide fibers from a neutral to weakly acid bath. The dyeings are very fast when aftertreated with a copper- or nickel-yielding agent and are bright bluish red or olive-green in shade.

*Example 2*

27.4 parts of 2-aminobenzene-1-carboxylic acid are diazotized as described in Example 1. The diazo solution is made alkaline and an ice-cold solution of 130 parts of 20% aqueous copper sulfate solution (CuSO$_4$.5H$_2$O) and 30 parts of triethanolamine is added to it. 56 parts of a 20% solution of 2-methyl cyclohexanone in chlorobenzene at 0° is dropped in at an even rate in 1 hour. Stirring is continued at 0° until the reaction is completed, the pH value is adjusted to 5 with the necessary amount of dilute acetic acid, and the mass heated at 60–70° until formation of the copper complex is completed. On cooling to room temperature the new copper-containing dyestuff is precipitated with common salt, filtered off, dried and ground. It is a dark powder which dissolves in water with red coloration. Wool and syntheic polyamide fibers can be dyed with it from a neutral bath in fast bluish red shades. The nickel-containing dyestuff produced in an analogous manner gives fast olive dyeings.

When the aforementioned amount of 2-methyl-cyclohexanone is replaced by an equivalent amount of a mixutre of o-, p- and m-methyl-cyclohexanone, or cyclopentanone, cyclohexanone or cycloheptanone, very similar copper-containing dyestuffs with equally good fastness properties are obtained. The corresponding nickel complex compounds can be produced in an analogous manner.

*Example 3*

26.4 parts of 2-amino-1-hydroxybenzene-4-sulfonic acid anilide are dissolved in 250 parts of warm water with 18 parts of 30% hydrochloric acid, and diazotized at 5° with 6.9 parts of sodium nitrite. At 0° the diazo suspension is alkalified to pH 12 with 40 parts of 30% sodium hydroxide solution. An ice-cold solution of 65 parts of 20% aqueous copper sulfate solution ($CuSO_4.5H_2O$) and 15 parts of triethanolamine is added. Over the next two hours 24.5 parts of a 20% solution of cyclohexanone in chlorobenzene are added dropwise at 0° at an even rate with thorough stirring. The mass is stirred at 0° until completion of the reaction and after neutralization of the reaction solution with dilute hydrochloric acid the new copper-containing dyestuff is precipitated with common salt and filtered off. After washing with aqueous common salt solution, drying and grinding, it is obtained as a dark powder which dissolves in water with a bright, blue coloration and dyes nitrogenous fibers from a neutral bath in bright, fast blue shades. When the copper sulfate is replaced by an equivalent amount of nickel sulfate, the same procedure gives rise to a nickel-containing dyestuff which gives dyeings equally as fast but more reddish than those of the copper-containing dyestuff. Both dyestuffs are suitable for dyeing cellulose acetate in the dope and as fiber.

Similar, equally good dyestuffs are obtained by the procedure of the foregoing example when the 26.4 parts of 2-amino-1-hydroxybenzene-4-sulfonic acid anilide are replaced by the equivalent amount of 2-amino-1-hydroxy-benzene-5-sulfonic acid-phenylamide,
2-amino-1-hydroxy-benzene-4- or -5-sulfonic acid-amide,
2-amino-1-hydroxy-benzene-4- or -5-sulfonic acid-cyclohexylamide,
2-amino-1-hydroxy-benzene-4- or -5-sulfonic acid-tetrahydronaphthyl-(1)-amide,
2-amino-1-hydroxy-benzene-4- or -5-sulfonic acid-tetrahydronaphthyl-(2)-amide,
2-amino-1-hydroxy-benzene-4- or -5-sulfonic acid-methylamide,
2-amino-1-hydroxy-benzene-4- or -5-sulfonic acid-butylamide,
2-amino-1-hydroxy-benzene-4- or -5-sulfonic acid-2'-hydroxyethylamide,
2-amino-1-hydroxy-benzene-4- or -5-sulfonic acid-3'-methoxypropylamide,
2-amino-1-hydroxy-benzene-4- or -5-sulfonic acid-3'-chlorophenylamide,
2-amino-1-hydroxy-benezene-4- or -5-sulfonic acid-3'-sulfamidophenylamide,
2-amino-1-hydroxy-benzene-4- or -5-sulfonic acid-3'-dimethylaminosulfonyl-phenylamide,
2-amino-1-hydroxy-benzene-4- or -5-sulfonic acid-naphthyl-(1)-amide,
2-amino-1-hydroxy-benzene-4- or -5-sulfonic acid-naphthyl-(2)-amide,
2-amino-1-hydroxy-benzene-4- or -5-sulfonic acid-3-acetamino-phenylamide,
2-amino-1-hydroxy-benzene-4- or -5-sulfonic acid-benzylamide,
2-amino-1-hydroxy-benzene-4- or -5-sulfonic acid-dimethylamide,
2-amino-1-hydroxy-4-methylsulfonyl-benzene,
2-amino-1-hydroxy-4-chlorobenzene,
2-amino-1-hydroxy-3,4,6-trichlorobenzene,
2-amino-1-hydroxy-4-acetaminobenzene,
2-amino-1-hydroxy-4-carbethoxyaminobenzene,
2-amino-1-hydroxy-4-methylsulfaminobenzene,
2-amino-1-hydroxy-4-dimethylaminosulfamino-benzene,
2-amino-1-hydroxy-4-nitro-benzene,
2-amino-1-hydroxy-4-tert.butyl-benzene,
2-amino-1-hydroxy-4-pyrrolidonyl-benzene.

*Example 4*

55.2 parts of 2-amino-1-hydroxy-6-carbethoxyaminobenzene-4-sulfonic acid are suspended in an ice-cold solution of 200 parts of water and 26 parts of 30% hydrochloric acid, and diazotized at 0° with 13.8 parts of sodium nitrite. To the neutralized diazo solution is added 9.8 parts of cyclohexanone dissolved in 50 parts of toluene, then in the course of several hours 250 parts of 10% sodium hydroxide solution are dropped in at an even rate at 0°. The mass is stirred further at 0° until completion of the reaction. A solution of 25 parts of crystallized copper sulfate in 200 parts of water, previously rendered alkaline with 30 parts of 25% ammonia solution, is added, and the reaction mass then heated at 60° until formation of the complex is completed. The pH value is reduced to 5 by dropping in dilute hydrochloric acid, after which sodium chloride is added and the copper-containing dyestuff filtered off. It dyes wool, silk and synthetic polyamide fibers from an acid bath in fast blue shades. With the nickel-containing dyestuff produced in an analogous manner, equally fast but slightly more reddish dyeings are obtained.

When the 55.2 parts of 2-amino-1-hydroxy-6-carbethoxyaminobenzene-4-sulfonic acid used in the foregoing example are replaced by the equivalent amount of 2-amino-1-hydroxy-5-carbethoxyamino-benzene-6-sulfonic acid,
2-amino-1-hydroxy-benzene-4-sulfonic acid,
2-amino-1-hydroxy-6-chlorobenzene-4-sulfonic acid,
2-amino-1-hydroxy-benzene-4,6-disulfonic acid,
2-amino-1-hydroxy-6-nitrobenzene-4-sulfonic acid,
2-amino-1-hydroxy-4-nitrobenzene-6-sulfonic acid or
2-amino-1-hydroxy-4-chlorobenzene-6-sulfonic acid, very similar and equally good dyestuffs are obtained by the procedure described in this example.

The dyeing can be carried out as follows:

2 parts of the copper-containing azo dyestuff obtained as described in Example 2 are dissolved in 4000 parts of water at 40–50° with the subsequent addition of 4 parts of ammonium sulfate. 100 parts of wetted wool are entered in this dyebath, which is then brought to the boil in 30 minutes and maintained at the boil for a further 45 minutes. The dyed wool is removed, rinsed with water and dried. It is dyed a brilliant blue-red shade which is fast to light, washing, milling and perspiration.

Having thus disclosed the invention, what I claim is:

1. A dyestuff selected from the group consisting of the 1:1 copper complexes and the 1:1 nickel complexes of azo dyes, said complexes being obtained by intimately admixing a solution of 1 molar proportion of a member selected from the group consisting of cyclopentanone, cyclohexanone, methylcyclohexanone and cycloheptanone in an organic solvent selected from the group consisting of orthodichlorobenzene, chlorobenzene and toluene, at a pH from 7 to 12 and at a temperature of about 0° C., with an aqueous solution of 2 molar proportions of a diazo compound selected from the group consisting of benzene and a substituted benzene bearing in ortho-position to the diazo group a substituent capable of metal complex formation, the last-mentioned substituent being selected from the group consisting of hydroxy and carboxy, the substituents of the substituted benzene being selected from the group consisting of sulfonic acid amide, N-sulfonic acid phenylamide, N-sulfonic acid benzylamide, N-sulfonic acid naphthylamide, N-sulfonic acid tetrahydronaphthylamide, N-sulfonic acid cyclohexylamide, N-sulfonic acid lower alkylamide, N-sulfonic acid-dimethylamide, N-sulfonic acid hydroxyethylamide, N-sulfonic acid-methoxypropylamide, N-sulfonic acid-chlorophenylamide, N-sulfonic acid sulfamido phenylamide, N-sulfonic-acid-3-acetaminophenylamide, chloro, acetamino, sulfonic acid, methylsulfonyl, carbethoxyamino, methylsulfamino, dimethylamino-sulfamino, nitro, pyrrolidonyl, until the ensuing coupling is completed, and then metallizing the obtained azo dye with a member selected from the group consisting of copper-yielding and nickel-yielding agents.

2. A process for the preparation of a dyestuff selected from the group consisting of 1:1 copper complexes and 1:1 nickel complexes of azo dyes, which process comprises intimately admixing a solution of 1 molar proportion of a member selected from the group consisting of cyclopentanone, cyclohexanone, methylcyclohexanone and cycloheptanone in an organic solvent selected from the group consisting of orthodichlorobenzene, chlorobenzene and toluene, at a pH from 7 to 12 and at a temperature of about 0° C., with an aqueous solution of 2 molar proportions of a diazo compound selected from the group consisting of benzene and a substituted benzene bearing in ortho-position to the diazo group a substituent capable of metal complex formation, the last-mentioned substituent being selected from the group consisting of hydroxy and carboxy, the substituents of the substituted benzene being selected from the group consisting of sulfonic acid amide, N-sulfonic acid phenylamide, N-sulfonic acid benzylamide, N-sulfonic acid naphthylamide, N-sulfonic acid tetrahydronaphthylamide, N-sulfonic acid cyclohexylamide, N-sulfonic acid lower alkylamide, N-sulfonic acid-dimethylamide, N-sulfonic acid hydroxyethylamide, N-sulfonic acid-methoxypropylamide, N-sulfonic acid-chlorophenylamide, N-sulfonic acid sulfamido phenylamide, N-sulfonic-acid-3-acetaminophenylamide, chloro, acetamino, sulfonic acid, methylsulfonyl, carbethoxyamino, methylsulfamino, dimethylamino-sulfamino, nitro, pyrrolidonyl, until the ensuing coupling is completed, and then metallizing the obtained azo dye with a member selected from the group consisting of copper-yielding and nickel-yielding agents.

3. The 1:1 copper complex compound obtained by cyclohexanone in chlorobenzene, at a pH of about 12 and at a temperature of about 0° C., with an aqueous solution of 2 molar proportions of 2-diazobenzene-1-carboxylic acid, until the ensuing coupling is completed, and then coppering the so-obtained azo dyestuff with a copper-yielding agent.

4. The 1:1 copper complex compound obtained by intimately admixing a solution of 1 molar proportion of 2-methyl-cyclohexanone in chlorobenzene, at a pH value of about 12 and at a temperature of about 0° C., with an aqueous solution of 2 molar proportions of 2-diazobenzene-1-carboxylic acid, until the ensuing coupling is completed, and then coppering the so-obtained azo dyestuff with a copper-yielding agent.

5. The 1:1 nickel complex compound obtained by intimately admixing a solution of 1 molar proportion of 2-methyl-cyclohexanone in chlorobenzene, at a pH value of about 12 and at a temperature of about 0° C., with an aqueous solution of 2 molar proportions of 2-diazobenzene-1-carboxylic acid, until the ensuing coupling is completed, and then nickeling the so obtained azo dyestuff with a nickel-yielding agent.

6. The 1:1 copper complex compound obtained by intimately admixing a solution of 1 molar proportion of cyclohexanone in chlorobenzene, at a pH of about 12 and at a temperature of about 0° C., with an aqueous solution of 2 molar proportions of 2-diazo-1-hydroxybenzene-4-sulfonic acid phenylamide, until the ensuing coupling is completed, and then coppering the so-obtained azo dyestuff with a copper-yielding agent.

7. The 1:1 copper complex compound obtained by intimately admixing a solution of 1 molar proportion of cyclohexanone in toluene, at a pH value of about 12 and at a temperature of about 0° C., with an aqueous solution of 2 molar proportions of 2-diazo-1-hydroxybenzene-6-carbethoxyaminobenzene-4-sulfonic acid, until the ensuing coupling is completed, and then coppering the so-obtained dyestuff with a copper-yielding agent.

References Cited in the file of this patent

UNITED STATES PATENTS

| | | |
|---|---|---|
| 2,088,911 | Krzikalla et al. | Aug. 3, 1937 |
| 2,183,997 | McNally et al. | Dec. 19, 1939 |